United States Patent
Goto

(10) Patent No.: US 7,226,881 B2
(45) Date of Patent: Jun. 5, 2007

(54) ULTRA LOW THERMAL EXPANSION TRANSPARENT GLASS CERAMICS

(75) Inventor: Naoyuki Goto, Machida (JP)

(73) Assignee: Kabushiki Kaisha Ohara, Kanagawa-ken (JP)

( * ) Notice: Subject to any disclaimer, the term of this patent is extended or adjusted under 35 U.S.C. 154(b) by 0 days.

(21) Appl. No.: 10/773,934

(22) Filed: Feb. 6, 2004

(65) Prior Publication Data

US 2005/0065011 A1  Mar. 24, 2005

Related U.S. Application Data

(60) Provisional application No. 60/505,740, filed on Sep. 25, 2004.

(30) Foreign Application Priority Data

Sep. 19, 2003  (JP) ............... 2003-327892

(51) Int. Cl.
  *C03C 10/14* (2006.01)
  *C03C 10/12* (2006.01)
(52) U.S. Cl. ............................. 501/4; 501/7
(58) Field of Classification Search ........ 501/4, 501/7
  See application file for complete search history.

(56) References Cited

U.S. PATENT DOCUMENTS

| | | | |
|---|---|---|---|
| 3,642,504 A | 2/1972 | Petzold et al. | |
| 4,851,372 A | 7/1989 | Lindig et al. | |
| 5,017,519 A * | 5/1991 | Morimoto et al. | 501/7 |
| 5,064,460 A | 11/1991 | Aitken | |
| 5,336,643 A | 8/1994 | Goto et al. | |
| 5,591,682 A | 1/1997 | Goto | |
| 5,922,271 A * | 7/1999 | Semar et al. | 264/602 |
| 5,972,816 A | 10/1999 | Goto | |
| 6,001,445 A | 12/1999 | Itoh et al. | |
| 6,197,710 B1 | 3/2001 | Ohara et al. | |
| 6,387,509 B1 | 5/2002 | Goto et al. | |
| 6,514,890 B1 * | 2/2003 | Nagata et al. | 501/4 |
| 6,593,258 B1 * | 7/2003 | Shimatani et al. | 501/4 |

(Continued)

FOREIGN PATENT DOCUMENTS

DE    1902432    * 10/1976

(Continued)

OTHER PUBLICATIONS

EPO Search Report, Dec. 21, 2004.

*Primary Examiner*—Karl Group
(74) *Attorney, Agent, or Firm*—Hedman & Costigan P.C.; James V. Costigan

(57) ABSTRACT

There are provided glass-ceramics having an ultra low thermal expansion property and super flat surface capable of coping with lithography for the next generation LSI and component parts for semiconductor equipment such as masks, optical reflecting mirrors, wafer stages and reticle stages and various precision parts using such glass-ceramics. Glass-ceramics of the invention have an average linear thermal expansion coefficient within a range of $0.0 \pm 0.2 \times 10^{-7}/°C$. within a temperature range from 0° C. to 50° C., have difference between the maximum value and the minimum value of $\Delta L/L$ of $10 \times 10^{-7}$ or below, and comprise $SiO_2$, $Al_2O_3$ and $P_2O_5$ with the total amount thereof in mass % being within a range from 86.0% to 89.0%.

29 Claims, 3 Drawing Sheets

U.S. PATENT DOCUMENTS

| | | |
|---|---|---|
| 6,673,729 B2 * | 1/2004 | Siebers et al. .................. 501/4 |
| 2002/0022564 A1 | 2/2002 | Minamikawa et al. |
| 2003/0099062 A1 | 5/2003 | Kataoka et al. |
| 2003/0125184 A1 * | 7/2003 | Mitra ............................ 501/7 |

FOREIGN PATENT DOCUMENTS

| | | |
|---|---|---|
| JP | 11-292616 | 10/1999 |
| JP | 2001-150452 | 6/2001 |
| JP | 2003-192385 | 7/2003 |

* cited by examiner

ULTRA LOW THERMAL EXPANSION TRANSPARENT GLASS CERAMICS

This application claims priority to provisional application Ser. No. 60/505,740, filed Sep. 25, 2004 and to Japanese Application Serial No. 2003-327892, filed Sep. 19, 2003.

BACKGROUND OF THE INVENTION

This invention relates to glass-ceramics capable of being used broadly for various precision parts which require an ultra low thermal expansion property, super surface flatness or a high rigidity and being particularly suitable for use as various parts of next generation semiconductor equipment.

In the present specification, the term "difference between the maximum value and the minimum value of $\Delta L/L$" means difference in a temperature range from 0° C. to a given temperature between the maximum value and the minimum value of $\Delta L/L$ where L represents length of a piece of a glass-ceramic at 0° C. and $\Delta L$ represents amount of change in the length of the glass-ceramic at the given temperature.

In the present specification, the term "ultra low thermal expansion property" means a property of a glass-ceramic which has an average linear thermal expansion coefficient within a range of $0.0\pm0.2\times10^{-7}/°$ C., preferably $0.0\pm0.1\times10^{-7}/°$ C. within a temperature range from 0° C. to 50° C. and has difference between the maximum value and the minimum value of $\Delta L/L$ of $10\times10^{-7}$ or below, preferably $8\times10^{-7}$ or below.

In the present specification, "predominant crystal phase" means all crystal phases which have a relatively large ratio of precipitation. More specifically, "predominant crystal phase" includes all crystal phases each of which, when X-ray diffraction intensity of a main peak (the highest peak) of a crystal phase which has the largest ratio of precipitation in an X-ray chart of X-ray diffraction (the vertical axis representing X-ray diffraction intensity and the horizontal axis representing diffraction angle) is assumed to be 100, has a main peak (the highest peak in the crystal phase) whose ratio of X-ray diffraction intensity (hereinafter referred to as "X-ray diffraction intensity ratio") is 30 or over. X-ray diffraction intensity ratios of crystal phases other than the predominant crystal phases should preferably be less than 20 and, more preferably less than 10 and most preferably, less than 5.

In recent technology of lithography, development of a higher density integration in a semiconductor circuit enhances an active development for reducing width of exposure line. For example, as a next generation technology, development of technology using KrF laser beam with a wavelength of 0.248 μm or ArF laser beam with a wavelength of 0.193 μm has been actively made in the optical type lithography. Further, for realizing a smaller semiconductor circuit, there have been made a development of a variable wavelength system using EPL (electron projection lithography) and a development of EUV (extreme ultraviolet) system using extreme ultraviolet ray having wavelength of 0.0134 μm.

Component parts used for such next generation lithography technology for the manufacture of semiconductors are required to have thermal stability in size, strength, thermal durability and chemical stability, particularly an ultra low thermal expansion property which is necessary for thermal stability in size.

As component parts of the prior art semiconductor equipment, Si and $SiO_2$ materials have been used. The Si material is a high thermal expansion material with an average linear thermal expansion coefficient $\alpha$ of $30\times10^{-7}/°$ C. and the $SiO_2$ material which is of a relatively low thermal expansion property still has $\alpha$ of $5\times10^{-7}/°$ C. which is far from being satisfactory for the ultra low thermal expansion property required for a high precision design and, therefore, has difficulty in application for the next generation lithography.

As materials for eliminating the defects of these materials, general transparent glass-ceramics and $SiO_2$—$TiO_2$ glasses manufactured by CVD (chemical vapor deposition) may be considered. The material manufactured by CVD, however, is not free from defects in the form of cords produced in one direction by stacking of the material with the result that the average linear thermal expansion coefficient of the material obtained has anisotropy and, therefore, is not satisfactory in thermal stability in size.

Aside from the quartz glass and the $SiO_2$—$TiO_2$ glass, known in the field of general transparent glass-ceramics is a $SiO_2$—$Al_2O_3$—$Li_2O$ transparent glass-ceramic which has realized various low thermal expansion characteristics. For example, Japanese Patent Publication 77137/1991 and U.S. Pat. No. 4,851,372 disclose glass-ceramics which comprise $TiO_2$ and $ZrO_2$ as nucleating agents and additionally comprise $P_2O_5$, MgO, CaO, $Na_2O$ and $K_2O$ as optional ingredients. These glass-ceramics, however, have a large average linear thermal expansion coefficient of $1\times10^{-7}/°$ C. and the highly accurate ultra low thermal expansion property which is the object of the present invention is not considered in these publications at all.

Japanese Patent No. 2668057 discloses glass-ceramics which comprise $TiO_2$ and $ZrO_2$ as nucleating agents. These glass-ceramics also have a broad range of average linear thermal expansion coefficient of $0\pm5\times10^{-7}/°$ C. and the highly accurate ultra low thermal expansion property which is the object of the present invention is not considered in this publication at all.

Various parts used in the lithography technology for the next generation semiconductor equipment are required to have the following properties for reduction in the width of the exposure line of the integrated circuit and also for higher accuracy of the integrated circuit:

(1) The parts should have an ultra low thermal expansion property.
(2) The parts should have a super flat surface roughness after polishing.
(3) For realizing the flatness, the average crystal grain diameter of the material should be very small.
(4) Influences by heat and vibration should be minimum.
(5) The parts should be free of $Na_2O$ and $K_2O$ ingredients which tend to cause contamination of the materials of the parts in the film forming and rinsing processes.

It is, therefore, an object of the present invention to provide glass-ceramics which have eliminated the above described defects of the prior art materials and have realized the ultra low thermal expansion property and super flat surface capable of coping with lithography for the next generation LSI.

It is another object of the invention to provide component parts for semiconductor equipment such as masks, optical reflecting mirrors, wafer stages and reticle stages and various precision parts.

SUMMARY OF THE INVENTION

Laborious studies and experiments made by the inventors of the present invention for achieving the above objects of the invention have resulted in the finding, which has led to the present invention, that, in glass-ceramics having a glass-composition within a specific composition range and a specific predominant crystal phase or phases, ultra low thermal expansion transparent glass-ceramics which are significantly advantageous over the prior art glass-ceramics can be obtained which have an average linear thermal expansion coefficient whitin a range of $0.0\pm0.2\times10^{-7}/°$ C. within a temperature range from 0° C. to 50° C., having difference between the maximum value and the minimum value of $\Delta L/L$ of $10\times10^{-7}$ or below, and preferably being made of fine crystal grains having an average crystal grain diameter within a range from 50 nm to 90 nm and having also a super flat surface with surface roughness Ra after polishing of 3 Å or below, and, moreover, being free from diffusion of PbO, $Na_2O$, $K_2O$ and $B_2O_3$ ions.

According to the present invention, there are provided glass-ceramics having an average linear thermal expansion coefficient within a range of $0.0\pm0.2\times10^{-7}/°$ C. within a temperature range from 0° C. to 50° C., having difference between the maximum value and the minimum value of $\Delta L/L$ of $10\times10^{-7}$ or below, and comprising $SiO_2$, $Al_2O_3$ and $P_2O_5$ with the total amount thereof in mass % being within a range from 86.0% to 89.0%.

In one aspect of the present invention, the ratio of $P_2O_5$ to $SiO_2$ and the ratio of $P_2O_5$ to $Al_2O_3$ are

| | |
|---|---|
| $P_2O_5/SiO_2$ | 0.1230-0.1450 and |
| $P_2O_5/Al_2O_3$ | 0.270-0.330. |

In another aspect of the invention, there are provided glass-ceramics having an average linear thermal expansion coefficient within a range of $0.0\pm0.1\times10^{-7}/°$ C. within a temperature range from 0° C. to 50° C., having difference between the maximum value and the minimum value of $\Delta L/L$ of $8\times10^{-7}$ or below, and comprising $SiO_2$, $Al_2O_3$ and $P_2O_5$ with the total amount thereof in mass % being within a range from 86.0% to 89.0%.

In another aspect of the invention, the ratio of $P_2O_5$ to $SiO_2$ and the ratio of $P_2O_5$ to $Al_2O_3$ of the glass-ceramics are

| | |
|---|---|
| $P_2O_5/SiO_2$ | 0.1230-0.1450 and |
| $P_2O_5/Al_2O_3$ | 0.270-0.330. |

In another aspect of the invention, the glass-ceramics have surface roughness (Ra) (arithmetic mean roughness) of 3 Å or below.

In another aspect of the invention, the glass-ceramics have an average crystal grain diameter of precipitating crystal phase or phases within a range from 50 nm to 90 nm.

In another aspect of the invention, the glass-ceramics comprise β-quartz (β-$SiO_2$) and/or β-quartz solid solution (β-$SiO_2$ solid solution) as a predominant crystal phase.

In another aspect of the invention, the glass-ceramics are free of PbO, $Na_2O$, $K_2O$ and $B_2O_3$.

In another aspect of the invention, the glass-ceramics are obtained by heat treating, for crystallization, a base glass which comprises, in mass %,

| | |
|---|---|
| $SiO_2$ | 53-57% |
| $P_2O_5$ | 7.0-8.5% and |
| $Al_2O_3$ | 23-26% | and is substantially free of PbO, $Na_2O$, $K_2O$ and $B_2O_3$, said glass-ceramics comprising β-quartz (β-$SiO_2$) and/or β-quartz solid solution (β-$SiO_2$ solid solution) as a predominant crystal phase.

In another aspect of the invention, the glass-ceramics comprise, in mass %, $Li_2O$ within a range of 3.5-4.5%.

In another aspect of the invention, the glass-ceramics comprise, in mass %,

| | |
|---|---|
| MgO | 0.5-1.5% and/or |
| ZnO | 0.1-1.5% and/or |
| CaO | 0.5-1.5% and/or |
| BaO | 0.5-1.5% and/or |
| $TiO_2$ | 1.5-3.0% and/or |
| $ZrO_2$ | 1.0-3.0% and/or |
| $As_2O_3$ | 0.5-1.0%. |

In another aspect of the invention, the maximum temperature of the heat treatment for crystallization is within a range from 750° C. to 800° C.

In another aspect of the invention, there is provided a mask for lithography using these glass-ceramics.

In another aspect of the invention, there is provided an optical system reflecting mirror for lithography using these glass-ceramics.

In another aspect of the invention, there is provided a wafer stage or a reticle stage for lithography using these glass-ceramics.

In still another aspect of the invention, there is provided a component part of a precision instrument using these glass-ceramics.

According to the invention, there is provided an excellent, ultra low thermal expansion transparent glass-ceramic material which has mechanical strength capable of coping with the film forming process under a high temperature and stress caused by forming of a multi-layer film, and also has resistance to a high temperature, super flatness of the surface of the substrate which enables production of a highly accurate parts, low diffusion of alkali ingredients from the substrate during the film forming or annealing process under a high temperature, an excellent light transmitting property and an ultra low thermal expansion property and is capable of realizing highly accurate super precision component parts, semiconductor parts and structural members. There are also provided component parts of semiconductor equipment and component parts of precision instruments using this glass-ceramic material.

Further, as compared with the prior art glass-ceramics, the glass-ceramics of the present invention can be manufactured by melting raw materials of a base glass at a relatively low temperature and heat treating the base glass at a low crystallizing temperature of 800° C. or below and, therefore, the glass-ceramics can be manufactured at a relatively low cost.

BRIEF DESCRIPTION OF THE DRAWINGS

In the accompanying drawings.

DESCRIPTION OF PREFERRED EMBODIMENTS

Figure 1:
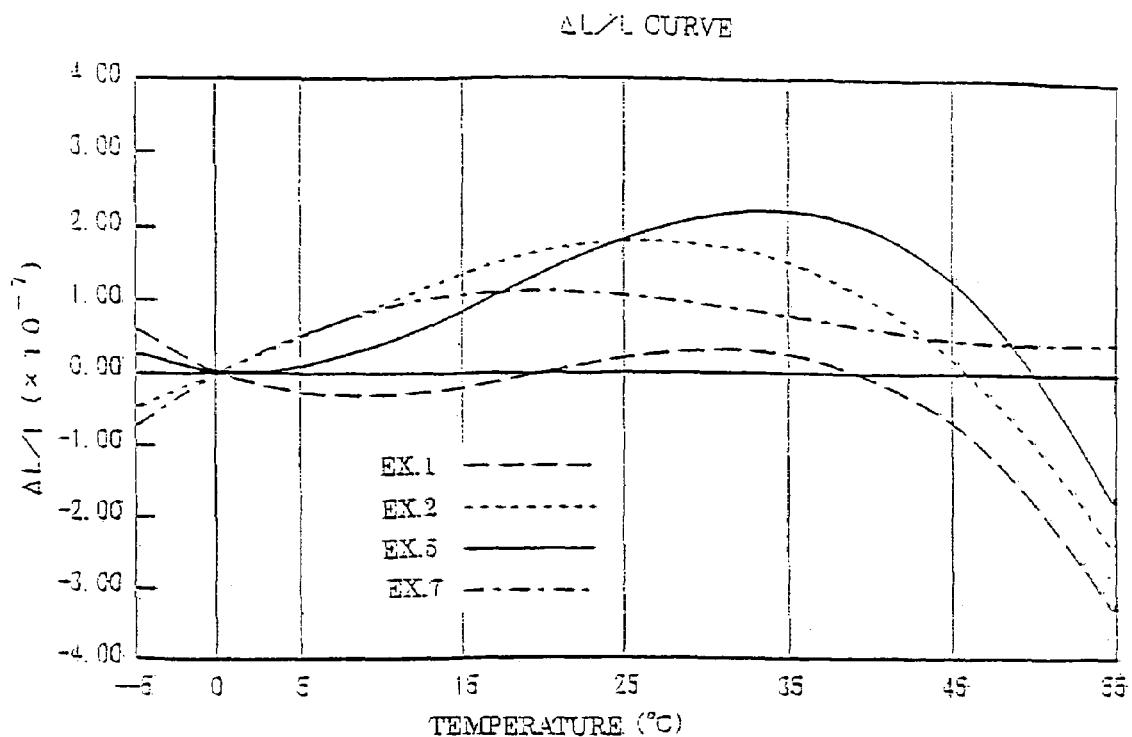
FIG. 1 is a graph showing $\Delta L/L$ curve within a range from 0° C. to 50° C. of Example Nos. 1, 2, 5 and 7.

Reasons for limiting the thermal and physical properties, predominant crystal phases and crystal grain diameter, surface roughness and composition of the glass-ceramics of the invention as defined above will be described below.

As regards the average linear thermal expansion coefficient, as described above, in the semiconductor equipment and super precision instruments, a thermal expansion property of a material capable of coping with the tendency toward higher accuracy is required. For this reason, the material should preferably have an average linear thermal expansion coefficient within a range of $0.0\pm0.2\times10^{-7}/°$ C., more preferably $0.0\pm0.1\times10^{-7}/°$ C. within a temperature range from 0° C. to 50° C., and have difference between the maximum value and the minimum value of $\Delta L/L$ of $10\times10^{-7}$ or below, more preferably $8\times10^{-7}$ or below.

As regards the surface roughness after polishing and crystal grain diameter, as described above, in the semiconductor equipment and super precision instruments, relation between the average crystal grain diameter and the surface roughness is important for maintaining flatness of the surface of the substrate capable of coping with the tendency toward higher accuracy. For this reason, the surface roughness Ra after polishing should preferably be 3 Å or below, more preferably 2 Å or below. For obtaining this flatness easily, the average crystal grain diameter of precipitating crystals should preferably be 90 nm or below, more preferably 80 nm or below. On the other hand, for realizing desired mechanical strength of the glass-ceramics, the average crystal grain diameter should preferably be 50 nm or over, more preferably 60 nm or over.

As regards the predominant crystal phase which precipitates in the glass-ceramics, this is an important factor which determines the average linear thermal expansion coefficient. In the glass-ceramics of the present invention, the average linear thermal expansion coefficient of the glass-ceramics as a whole within a desired range is achieved by producing a predominant crystal phase having a negative average linear thermal coefficient. For this purpose, the glass-ceramics should preferably comprise β-quartz (β-$SiO_2$) or β-quartz solid solution (β-$SiO_2$ solid solution) as the predominant crystal phase. In the present specification, "β-quartz solid solution" means β-quartz containing an interstitial and/or substitutional element or elements other than Si and O. In the glass-ceramics of the present invention, in particular, a preferable β-quartz solid solution is a crystal in which equilibrium is maintained by substitution of $Si^{+4}$ atoms by $Al^{+3}$ atoms and addition of $Li^+$, $Mg^{+2}$ and $Zn^{+2}$ atoms.

Reasons for limiting the respective ingredients to the above described amount ranges will now be described. The amount of the respective ingredients is expressed in mass %.

The $SiO_2$ ingredient is a very important ingredient which produces the above described crystal as the predominant crystal phase by heat treating the base glass. If the amount of this ingredient is 53% or over, the crystal precipitating in the glass-ceramics produced is stable and its texture hardly becomes coarse and, as a result, mechanical strength of the glass-ceramics is improved and the surface roughness after polishing of the glass-ceramics becomes small. If the amount of this ingredient is 57% or below, melting and forming of the base glass are easy and homogeneity of the glass-ceramics is increased. For achieving these effects more easily, a preferable lower limit of the amount of this ingredient is 54% and a more preferable lower limit is 54.5%. Likewise, a preferable upper limit of this ingredient is 56%, and a more preferable upper limit is 55.8%.

The $P_2O_5$ ingredient is effective, when it coexists with the $SiO_2$ ingredient, for improving the melting property and clarity of the base glass and also for stabilizing the thermal expansion property after crystallization by the heat treatment to a desired value. In the glass-ceramics of the present invention, if the amount of the $P_2O_5$ ingredient is 7.0% or over, these effects sharply increase and, if the amount of this ingredient is 8.5% or below, the base glass has excellent resistance to devitrification and this prevents the texture of the glass-ceramics from becoming coarse due to decrease in resistance to devitrification during the crystallizing process and, as a result, the mechanical strength of the glass-ceramics is improved. For achieving these effects more easily, a preferable lower limit of the amount of this ingredient is 7.3% and a more preferable lower limit is 7.4%. Likewise, a preferable upper limit of this ingredient is 7.9%, and a more preferable upper limit is 7.7%.

If the amount of the $Al_2O_3$ ingredient is within a range from 23% to 26%, melting of the base glass becomes easy and, as a result, homogeneity of the glass-ceramics produced is improved and chemical durability of the glass-ceramics becomes excellent. Further, if the amount of this ingredient is 26% or below, resistance to devitrification of the base glass is improved and this prevents the texture of the glass-ceramics from becoming coarse due to decrease in resistance to devitrification during the crystallizing process and, as a result, the mechanical strength of the glass-ceramics is improved. For achieving these effects more easily, a preferable lower limit of the amount of this ingredient is 24% and a more preferable lower limit is 24.2%. Likewise, a preferable upper limit of this ingredient is 25%, and a more preferable upper limit is 24.7%.

If the total amount of $SiO_2$, $Al_2O_3$ and $P_2O_5$ is 86.0%-89.0%, the ratio of $P_2O_5$ to $SiO_2$ is 0.1230-0.1450, and the ratio of $P_2O_5$ to $Al_2O_3$ is 0.270-0.330, the low thermal expansion property within the temperature range from 0° C. to 50° C. is significantly improved to achieve the ultra low thermal expansion property. For achieving this effect more easily, a preferable lower limit of the total amount of $SiO_2$, $Al_2O_3$ and $P_2O_5$ is 86.5% and a more preferable lower limit of the total amount is 86.7%. A preferable lower limit of the ratio of $P_2O_5$ to $SiO_2$ is 0.1310 and a more preferable lower limit thereof is 0.1320. A preferable lower limit of the ratio of $P_2O_5$ to $Al_2O_3$ is 0.290 and a more preferable lower limit thereof is 0.300. A preferable upper limit of the total amount of $SiO_2$, $Al_2O_3$ and $P_2O_5$ is 88.0% and a more preferable upper limit thereof is 87.8%. A preferable upper limit of the ratio of $P_2O_5$ to $SiO_2$ is 0.1420 and a more preferable upper limit is 0.1400. A preferable upper limit of the ratio of $P_2O_5$ to $Al_2O_3$ is 0.320.

The three ingredients of $Li_2O$, MgO and ZnO are important ingredients which constitute β-quartz solid solution. Further, these ingredients are important in that, when these ingredients coexist with the $SiO_2$ and $P_2O_5$ ingredients within the specific composition ranges, these ingredients improve the low thermal expansion property of the glass-ceramics and reduce deflection at a high temperature of the glass-ceramics, and, moreover, significantly improve the melting property and clarity of the base glass.

If the amount of the $Li_2O$ ingredient is 3.5% or over, the above described effects sharply increase and homogeneity of the base glass is greatly improved by the improvement in the melting property of the glass. Further, precipitation of the desired crystal phase sharply increases. If the amount of this ingredient is 4.5% or below, the low thermal expansion property is sharply improved to enable the ultra low thermal expansion property to be readily achieved, and resistance to devitrification of the base glass is improved and this prevents the texture of the glass-ceramics from becoming coarse due to decrease in resistance to devitrification during the crystallizing process and, as a result, the mechanical strength of the glass-ceramics is improved. For achieving these effects more easily, a preferable lower limit of the amount of this ingredient is 3.8% and a more preferable lower limit is 3.9%. Likewise, a preferable upper limit of this ingredient is 4.1%.

If the amount of the MgO ingredient is 0.5% or over, the above described effects sharply increase and, if the amount of this ingredient is 1.5% or below, the low thermal expansion property is sharply improved and the ultra low thermal expansion property thereby can be achieved. For achieving these effects more easily, a preferable lower limit of the amount of this ingredient is 0.6% and a more preferable lower limit is 0.7%%. Likewise, a preferable upper limit of this ingredient is 1.4% and a more preferable upper limit is 1.3%.

If the amount of the ZnO ingredient is 0.1% or over, the above described effects sharply increase and, if the amount of this ingredient is 1.5% or below, the low thermal expansion property is sharply improved to enable the ultra low thermal expansion property to be achieved, and resistance to devitrification of the base glass is improved and this prevents the texture of the glass-ceramics from becoming coarse due to decrease in resistance to devitrification during the crystallizing process and, as a result, the mechanical strength of the glass-ceramics is improved. For achieving these effects more easily, a preferable lower limit of the amount of this ingredient is 0.2% and a more preferable lower limit is 0.3%%. Likewise, a preferable upper limit of this ingredient is 1.2% and a more preferable upper limit is 0.9%.

The two ingredients of CaO and BaO remain as glass matrix which is a portion of the glass-ceramics other than the crystal precipitating in the glass-ceramics. These ingredients are important as ingredients which perform fine adjustment between the crystal phase and the glass-matricx for improvement in the ultra low thermal expansion property and the melting property.

If the amount of the CaO ingredient is 0.5% or over, the melting and clarifying effects are achieved remarkably and, if the amount of this ingredient is 1.5% or below, the low thermal expansion property is sharply improved to enable the ultra low thermal expansion property to be achieved, and resistance to devitrification of the base glass is improved and this prevents the texture of the glass-ceramics from becoming coarse due to decrease in resistance to devitrification during the crystallizing process and, as a result, the mechanical strength of the glass-ceramics is improved. For achieving these effects more easily, a preferable lower limit of the amount of this ingredient is 0.6% and a more preferable lower limit is 0.7%%. Likewise, a preferable upper limit of this ingredient is 1.4% and a more preferable upper limit is 1.3%.

If the amount of the BaO ingredient is within a range from 0.5% to 1.5%, the low thermal expansion property is sharply improved to enable the ultra low thermal expansion property to be achieved, and resistance to devitrification of the base glass is improved and this prevents the texture of the glass-ceramics from becoming coarse due to decrease in resistance to devitrification during the crystallizing process and, as a result, the mechanical strength of the glass-ceramics is improved. For achieving these effects more easily, a preferable lower limit of the amount of this ingredient is 0.6% and a more preferable lower limit is 0.7%%. Likewise, a preferable upper limit of this ingredient is 1.4% and a more preferable upper limit is 1.3%.

The TiO and $ZrO_2$ ingredients are indispensable as nucleating agents. If the amount of the $TiO_2$ ingredient is 1.5% or over and the amount of the $ZrO_2$ ingredient is 1.0% or over, precipitation of the desired crystal phase becomes possible. If the amounts of these ingredients are respectively 3% or below, occurrence of unmelted portion of the glass is prevented with resulting increase in the melting property and improvement in homogeneity of the glass. For achieving these effects more easily, a preferable lower limit of the $TiO_2$ ingredient is 1.7% and a more preferable lower limit is 1.9%. A preferable lower limit of the $ZrO_2$ ingredient is 1.3% and a more preferable lower limit is 1.6%. A preferable upper limit of the $TiO_2$ ingredient is 2.9% and a more preferable upper limit is 2.8%. A preferable upper limit of the $ZrO_2$ ingredient is 2.7% and a more preferable upper limit is 2.4%.

The $AS_2O_3$ ingredient may be added as a refining agent during melting of the glass materials for achieving a homogeneous product. For achieving this effect, this ingredient should preferably be added within the range from 0.5% to 1.0%.

In addition to the above described ingredients, one or more of SrO, $B_2O_3$, $F_2$, $La_2O_3$, $Bi_2O_3$, $WO_3$, $Y_2O_3$, $Gd_2O_3$ and SnO may be added in a total amount of 2% or below for the purpose of fine adjustment of properties of the glass-ceramics and within a range in which the properties of the glass-ceramics are not impaired. One or more coloring ingredients such as CoO, NiO, $MnO_2$, $Fe_2O_3$ and $Cr_2O_3$ may also be added in a total amount of 2% or below. In a case, however where the glass-ceramics of the present invention are used for a purpose which requires a high light transmittance, these coloring ingredients should preferably be not included.

In the glass-ceramics of the present invention, a predominant crystal phase having a negative average linear thermal expansion coefficient is caused to precipitate and, by combination of this predominant crystal phase with a glass matrix phase having a positive average linear thermal expansion coefficient, glass-ceramics having an ultra low thermal expansion property as a whole are realized. For this purpose, the glass-ceramics should preferably not contain crystal phases which have a positive average linear thermal coefficient such as lithium disilicate, lithium silicate, α-quartz, α-cristobalite, α-tridymite, Zn-petalite and other petalites, wollastonite, forsterite, diopside, nepheline, clinoenstatite, anorthite, celsian, gehlenite, feldspar, willemite, mullite, corundum, rankinite, larnite and solid solutions of these crystals. Further, for maintaining excellent mechanical strength, the glass-ceramics should preferably not contain Hf-tangstate, Zr-tangstate and other tangstates, magnesium titanate, barium titanate, manganese titanate and other titanates, mullite, $2Ba3SiO_2$, $Al_2O_3 \cdot 5SiO_2$ and solid solutions of these crystals.

For coping with the lithography technology for the next generation semiconductor equipment, thermal conductivity and Young's modulus of the glass-ceramics of the present invention should preferably be the following values. The thermal conductivity should preferably be within a range from 1.0W/(m·k) to 2.0W/(m·k) for promptly dissipating heat from a material which is heated during the film forming process or irradiation of electron beam. A more preferable lower limit of thermal conductivity is 1.5W/(m·k) and/or a more preferable upper limit of thermal conductivity is 1.9W/(m·k). When the glass-ceramics are used as a precision part, Young's modulus is important for preventing occurrence of fine defects in a process for making the part light, in a super precision grinding and in a super fine processing, and also for reducing adverse effects produced by outside factors such as vibrations caused by various reasons. A preferable range of Young's modulus is 85-95GPa and a more preferable range thereof is 90GPa in the lower limit and/or 94 GPa in the upper limit.

The ultra low thermal expansion transparent glass-ceramics of the present invention are manufactured by the following process.

Glass materials are weighed and mixed and put in a crucible and melted at a temperature within a range from about 1500° C. to 1600° C. to provide a base glass.

After obtaining the base glass by melting of the raw materials, the base glass is formed to a desired shape by casting in a mold and/or hot forming.

Then, the base glass is subjected to heat treatment for producing glass-ceramics. First, the base glass is held, for nucleation, at a temperature within a range from 650° C. to 750° C., preferably 680° C. in the lower limit and 720° C. in the upper limit.

After nucleation, the base glass is crystallized at a temperature within a range from 750° C. to 800° C. If the temperature is lower than 750° C., the predominant crystal phase does not grow sufficiently whereas if the temperature is higher than 800° C., the base glass tends to be deformed due to softening or remelted. A more preferable crystallization temperature is 770° C. in the lower limit and/or 790° C. in the upper limit.

Further, a mask, an optical system reflecting mirror, a wafer stage, a reticle stage and a part for a precision instrument are produced by forming the glass-ceramics to a desired shape and subjecting the glass-ceramics to lapping, polishing and film forming processes according to the necessity.

EXAMPLES

Examples of the present invention will now be described. Tables 1 and 2 show examples of compositions (Example No. 1 to Example No. 7) of the ultra low thermal expansion transparent glass-ceramics of the present invention and compositions of the prior art $Li_2O$—$Al_2O_3$—$SiO_2$ low expansion glass-ceramics (Comparative Example Nos. 1 and 2) together with their highest heat treatment temperature, average crystal grain diameter, surface roughness (Ra) after polishing, average linear thermal expansion coefficient within the temperature range from 0° C. to 50° C. and difference between the maximum value and the minimum value in ΔL/L. The compositions of the respective examples and comparative examples are shown in mass %.

It should be noted that the present invention is in no way limited by these examples.

TABLE 1

| | Examples | | | | |
|---|---|---|---|---|---|
| | 1 | 2 | 3 | 4 | 5 |
| $SiO_2$ | 55.00 | 55.50 | 55.50 | 55.50 | 55.50 |
| $P_2O_5$ | 7.60 | 7.50 | 7.60 | 7.55 | 7.60 |
| $Al_2O_3$ | 24.40 | 24.50 | 24.40 | 24.45 | 24.40 |

TABLE 1-continued

| | Examples | | | | |
|---|---|---|---|---|---|
| | 1 | 2 | 3 | 4 | 5 |
| $Li_2O$ | 4.00 | 3.95 | 3.95 | 3.95 | 3.97 |
| MgO | 1.00 | 1.00 | 1.00 | 1.00 | 1.00 |
| ZnO | 0.50 | 0.50 | 0.50 | 0.50 | 0.50 |
| CaO | 1.00 | 1.05 | 1.05 | 1.05 | 1.03 |
| BaO | 1.00 | 1.00 | 1.00 | 1.00 | 1.00 |
| $TiO_2$ | 2.50 | 2.30 | 2.30 | 2.30 | 2.30 |
| $ZrO_2$ | 2.00 | 2.00 | 2.00 | 2.00 | 2.00 |
| $As_2O_3$ | 1.00 | 0.70 | 0.70 | 0.70 | 0.70 |
| $P_2O_5/SiO_2$ | 0.1382 | 0.1351 | 0.1369 | 0.1360 | 0.1369 |
| $P_2O_5/Al_2O_3$ | 0.311 | 0.306 | 0.311 | 0.309 | 0.311 |
| $SiO_2 + Al_2O_3 + P_2O_5$ | 87.00 | 87.50 | 87.50 | 87.50 | 87.50 |
| Highest crystallization temperature (° C.) | 780 | 770 | 770 | 780 | 785 |
| Average crystal grain diameter (nm) | 50 | 70 | 70 | 60 | 50 |
| Surface roughness (Ra Å) | 1.0 | 1.5 | 1.3 | 1.1 | 1.5 |
| Average linear thermal Expansion coefficient ($10^{-7}$/° C.)(0° C.-50° C.) | 0.02 | 0.04 | 0.03 | −0.02 | 0.06 |
| ΔL/L(Max-Min)($10^{-7}$) (0° C.-50° C.) | 2.1 | 2.8 | 7.8 | 6.2 | 2.2 |

TABLE 2

| | Examples | | Comparative Examples | |
|---|---|---|---|---|
| | 6 | 7 | 1 | 2 |
| $SiO_2$ | 55.50 | 55.50 | 53.00 | 55.00 |
| $P_2O_5$ | 7.35 | 7.50 | 8.00 | 8.00 |
| $Al_2O_3$ | 24.65 | 24.50 | 23.50 | 24.00 |
| $Li_2O$ | 3.95 | 3.95 | 3.80 | 4.00 |
| MgO | 1.00 | 1.00 | $Na_2O$ 0.70 | 1.00 |
| ZnO | 0.50 | 0.50 | 1.80 | 0.50 |
| CaO | 1.05 | 1.00 | 2.00 | 1.00 |
| BaO | 1.00 | 1.05 | 2.50 | 1.00 |
| $TiO_2$ | 2.30 | 2.30 | 2.30 | 2.50 |
| $ZrO_2$ | 2.00 | 2.00 | 1.40 | 2.00 |
| $As_2O_3$ | 0.70 | 0.70 | 0.80 | 1.00 |
| $P_2O_5/SiO_2$ | 0.1324 | 0.1351 | 0.1509 | 0.1455 |
| $P_2O_5/Al_2O_3$ | 0.298 | 0.306 | 0.340 | 0.333 |
| $SiO_2 + Al_2O_3 + P_2O_5$ | 87.50 | 87.50 | 84.50 | 87.00 |
| Highest crystallization temperature (° C.) | 780 | 785 | 850 | 800 |
| Average crystal grain diameter (nm) | 80 | 90 | 110 | 120 |
| Surface roughness (Ra Å) | 2.0 | 2.5 | 7 | 6 |
| Average linear thermal Expansion coefficient ($10^{-7}$/° C.) (0° C.-50° C.) | 0.08 | 0.04 | −0.23 | 0.25 |
| ΔL/L(Max-Min)($10^{-7}$) (0° C.-50° C.) | 3.8 | 1.1 | 10.3 | 10.1 |

Comparative Example No. 1 is Example No. 4 of Japanese Patent Publication No. Hei3-77137 and U.S. Pat. No. 4851372 and Comparative Example No. 2 is Example No. 7 of Japanese Patent No. 2668057.

For producing the glass-ceramics of these examples, raw materials such as oxides, carbonates and nitrates were mixed together and melted at a temperature of about 1450° C. to 1550° C. and stirred for homogenization and thereafter were formed to a desired shape and cooled to provide a formed glass. Then, this formed glass was heat treated at a temperature of 650° C. to 750° C. for about one to twelve hours for nucleation and thereafter heat treated at a temperature of 750° C. to 785° C. for about one to twelve hours for crystallization to provide desired glass-ceramics. The glass-ceramics were then subjected to lapping and polishing as a finishing process.

The surface roughness of the glass-ceramics was measured by using NanoScope 3AD3000 atomic force microscope made by Nihon Veeco K. K.

The average linear thermal expansion coefficient was measured by using a Fizeau interferometer type precision expansion measuring instrument.

The test portion was in the form of a cylinder having a diameter of 30 mm and length of about 27 mm.

For measuring the thermal expansion coefficient, the test portion was placed in a furnace capable of controlling temperature with an optical flat plate in contact with opposite surfaces of the test portion to enable observation of interference fringes caused by a HeNe laser. Then, the temperature of the test portion was varied to observe change in the interference fringes and thereby measure the amount of change in the length of the test portion with the change in the temperature. In actual measurement, the test portion was measured under conditions of rising temperatures and falling temperatures and an average of the amount of change in the length of the test portion under the two conditions was used as $\Delta L$.

For calculating the average linear thermal expansion coefficient, the following formula was employed to calculate the average linear thermal expansion coefficient $\alpha(/°C.)$:

$$\alpha=(\Delta L/L)/\Delta T$$

where $\alpha$ represents average linear thermal expansion coefficient, $\Delta T$ range of temperature in which the measurement is made and L length of the test portion.

Figure 2:
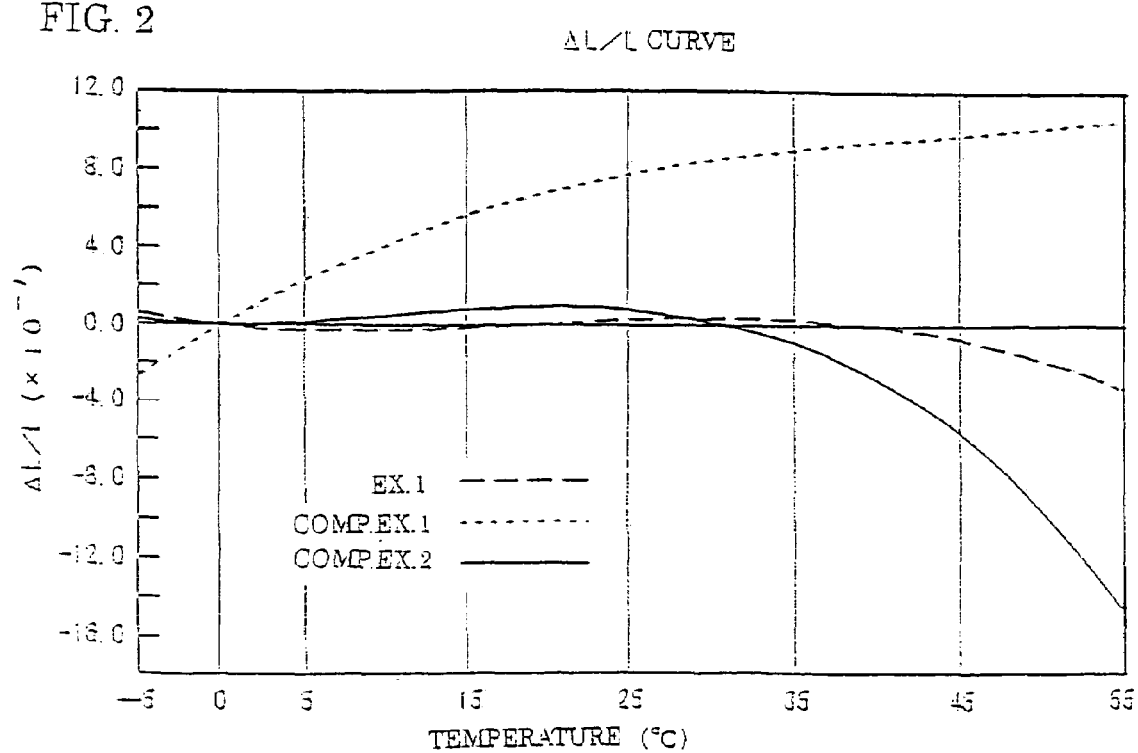
FIG. 2 is a graph showing $\Delta L/L$ within a range from 0° C. to 50° C. of Example No. 1 and Comparative Example Nos. 1 and 2.
Figure 3:
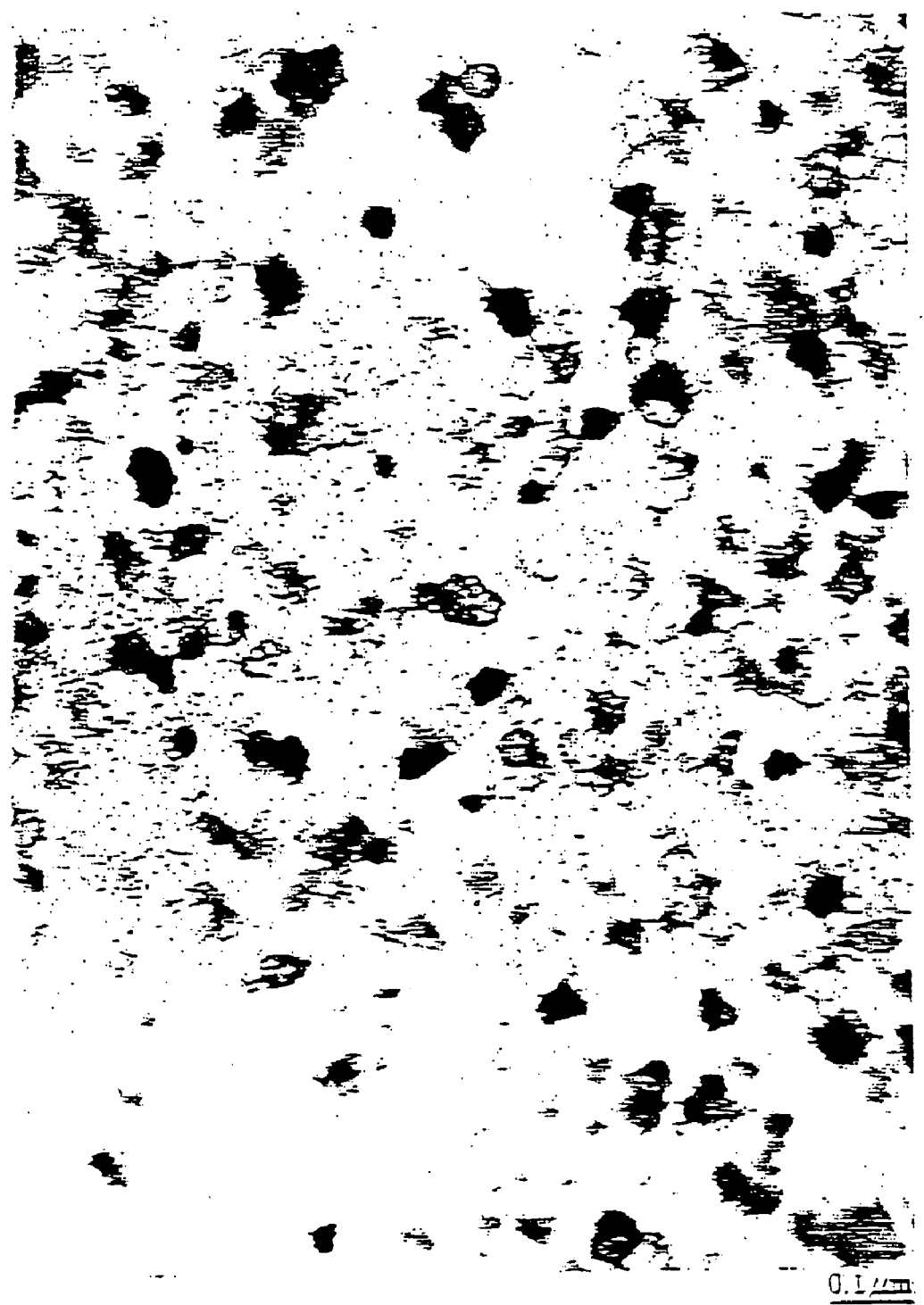
FIG. 3 is a microscopic view of the micro-structure of Example No1 1 by a transmission electron microscope.
Figure 4:
FIG. 4 is a microscopic view of the micro-structure of Comparative Example 1 by a transmission electron microscope.

As shown in Tables 1 and 2 and FIGS. 1 through 4, the ultra low thermal expansion transparent glass-ceramics of the present invention have the crystallization temperature of 785° C. or below, the fine crystal grain diameter of 90 nm or below and an excellent flat surface with the surface roughness Ra after polishing of 2.5 Å or below. The glass-ceramics of the present invention also exhibit an ultra low thermal expansion property with the average linear thermal expansion coefficient of 0±0.1 or below within the range from 0° C. to 50° C. and difference between the maximum value and the minimum value of $\Delta L/L$ of $7.8\times10^{-7}$ or below.

The ultra low thermal expansion transparent glass-ceramics of the present invention had thermal conductivity of 1.6W/(m·k)–1.8W/(m·k) and Young's modulus of 90 GPa–93 GPa. Further, as regards transmittance, 80% transmitting wavelength in a 5 mm thick specimen of Comparative Example No. 1 is 430 nm and that of Comparative Example No. 2 is 425 nm whereas that of the examples of the present invention is 395 nm–415 nm, exhibiting superior values of transmittance.

The glass-ceramics of the present invention are applicable to component parts of a semiconductor equipment such as masks for lithography, optical reflecting mirrors, wafer stages and reticle stages, component parts of a quartz exposing equipment, component parts of a large-scale reflecting mirror, and other various precision parts such as parts of a standard scale and a prototype and parts of a test instrument. Further, since the glass-ceramics of the present invention have high transparency, they are applicable also to substrates of an optical filter, transmission masks for lithography etc. which require high transmittance. For all other purposes, the glass-ceramics of the present invention can be effectively used for producing light-weight articles owing to the excellent mechanical strength of he glass-ceramics.

What is claimed is:

1. Glass-ceramics having an average liner thermal expansion coefficient within a range of $0.0\pm0.2\times10^{-7}/°$ C. within a temperature range from 0° C. to 50° C., having difference between the maximum value and the minimum value of $\Delta L/L$ of $10\times10^{-7}$ or below, and comprising $SiO_2$, $Al_2O_3$, and $P_2O_5$ with the total amount thereof in mass % being within a range from 86.7% to 89.0% and further comprising CaO in an amount of 0.5 mass % or more, wherein the ratio of $P_2O_5$ to $Al_2O_3$ in mass % is within a range from 0.270 to 0.33 and the ratio of $P_2O_5$ to $SiO_2$ in mass % is within a range from 0.1230 to 0.1450.

2. Glass-ceramics baying an average liner thermal expansion coefficient within a range of $0.0\pm0.1\times10^{-7}/°$ C. within a temperature range from 0° C. to 50° C., having difference between the maximum value and the minimum value of $\Delta L/L$ of $8\times10^{-7}$ or below, and comprising $SiO_2$, $Al_2O_3$ and $P_2O_5$ with the total amount thereof in mass % being within a range from 86.7% to 89.0% and further comprising CaO in an amount of 0.5 mass % or more, wherein the ratio of $P_2O_5$ to $Al_2O_3$ in mass % is within a range from 0.270 to 0.33 and the ratio of $P_2O_5$ to $SiO_2$ in mass % is within a range from 0.1230 to 0.1450.

3. Glass-ceramics as defined in claim 1 wherein surface roughness (Ra) (arithmetic mean roughness) is 3 Å or below.

4. Glass-ceramics as defined in claim 1 wherein an average crystal grain diameter of precipitating crystal phase or phases is within a range from 50 nm to 90 nm.

5. Glass-ceramics as defined in claim 1 which comprise β-quartz (β-$SiO_2$) and/or β-quartz solid solution (β-$SiO_2$ solid solution) as a predominant crystal phase.

6. Glass-ceramics as defined in claim 1 which are free of PbO, $Na_2O$, $K_2O$ and $B_2O_3$.

7. Glass-ceramics as defined in claim 1 obtained by heat treating, for crystallization, a base glass which comprises, in mass %,

| | |
|---|---|
| $SiO_2$ | 53-57% |
| $P_2O_5$ | 7.0-8.5% and |
| $Al_2O_3$ | 23-26% | and is substantially free of PbO, $Na_2O$, $K_2O$ and $B_2O_3$, said glass-ceramics comprising β-quartz (β-$SiO_2$) and/or β-quartz solid solution (β-$SiO_2$ solid solution) as a predominant crystal phase.

8. Glass-ceramics as defined in claim 7 comprising, in mass %, $Li_2O$ within a range of 3.5-4.5%.

9. Glass-ceramics as defined in claim 8 comprising, in mass %,

| | |
|---|---|
| CaO | 0.5-1.5% and |
| MgO | 0.5-1.5% and/or |
| ZnO | 0.1-1.5% and/or |
| BaO | 0.5-1.5% and/or |
| $TiO_2$ | 1.5-3.0% and/or |
| $ZrO_2$ | 1.0-3.0% and/or |
| $As_2O_3$ | 0.5-1.0%. |

10. Glass-ceramics as defined in claim 1 wherein the maximum temperature of the heat treatment for crystallization is within a range from 750° C. to 800° C.

11. A mask for lithography using glass-ceramics as defined in claim 1.

12. An optical system reflecting mirror for lithography using glass-ceramics as defined in claim 1.

13. A wafer stage or a reticle stage for lithography using glass-ceramics as defined in claim 1.

14. A component part of a precision instrument using glass-ceramics as defined in claim 1.

15. Glass-ceramics as defined in claim 2 wherein surface roughness (Ra) (arithmetic mean roughness) is 3 Å or below.

16. Glass-ceramics as defined in claim 2 wherein an average crystal grain diameter of precipitating crystal phase or phases is within a range from 50 nm to 90 nm.

17. Glass-ceramics as defined in claim 2 which comprise β-quartz (β-$SiO_2$) and/or, β-quartz solid solution (β-$SiO_2$ solid solution) as a predominant crystal phase.

18. Glass-ceramics as defined in claim 2 which are free of PbO, $Na_2O$, $K_2O$ and $B_2O_3$.

19. Glass-ceramics as defined in claim 2 obtained by heat treating, for crystallization, a base glass which, comprises, in mass %,

| | |
|---|---|
| $SiO_2$ | 53-57% |
| $P_2O_5$ | 7.0-8.5% and |
| $Al_2O_3$ | 23-26% | and is substantially free of PbO, $Na_2O$, $K_2O$ and $B_2O_3$, said glass-ceramics comprising β-quartz (β-$SiO_2$) and/or β-quartz solid solution (β-$SiO_2$ solid solution) as a predominant crystal phase.

20. Glass-ceramics as defined in claim 19 comprising, in mass %, $Li_2O$ within a range of 3.5-4.5%.

21. Glass-ceramics as defined in claim 20 comprising, in mass %,

| | |
|---|---|
| CaO | 0.5-1/5% and |
| MgO | 0.5-1.5% and/or |
| ZnO | 0.1-1.5% and/or |
| BaO | 0.5-1.5% and/or |
| $TiO_2$ | 1.5-3.0% and/or |
| $ZrO_2$ | 1.0-3.0% and/or |
| $As_2O_3$ | 0.5-1.0%. |

22. Glass-ceramics as defined in claim 2 wherein the maximum temperature of the heat treatment for crystallization is within a range from 750° C. to 800° C.

23. A mask for lithography using glass-ceramics as defined in claim 2.

24. An optical system reflecting mirror for lithography using glass-ceramics as defined in claim 2.

25. A wafer stage or a reticle stage for lithography using glass-ceramics as defined in claim 2.

26. A component part of a precision instrument using glass-ceramics as defined in claim 2.

27. Glass-ceramics as defined in claim 3 obtained by heat treating, for crystallization, a base glass which comprises, in mass %,

| | |
|---|---|
| $SiO_2$ | 53-57% |
| $P_2O_5$ | 7.0-8.5% and |
| $Al_2O_3$ | 23-26% | and is substantially free of PbO, $Na_2O$, $K_2O$ and $B_2O_3$, said glass-ceramics comprising β-quartz (β-$SiO_2$) and/or β-quartz solid solution (β-$SiO_2$ solid solution) as a predominant crystal phase.

28. Glass-ceramics as defined in claim 27 comprising, in mass %, $Li_2O$ within a range of 3.5-4.5%.

29. Glass-ceramics as defined in claim 28 comprising, in mass %,

| | |
|---|---|
| CaO | 0.5-1.5% and |
| MgO | 0.5-1.5% and/or |
| ZnO | 0.1-1.5% and/or |
| BaO | 0.5-1.5% and/or |
| $TiO_2$ | 1.5-3.0% and/or |
| $ZrO_2$ | 1.0-3.0% and/or |
| $As_2O_3$ | 0.5-1.0%. |

* * * * *